United States Patent
Jung et al.

(10) Patent No.: US 12,545,932 B2
(45) Date of Patent: Feb. 10, 2026

(54) RECOMBINANT MICROORGANISM INCLUDING GENETIC MODIFICATION THAT INCREASES ACTIVITY OF NITRIC OXIDE REDUCTASE AND METHOD OF REDUCING CONCENTRATION OF NITRIC OXIDE IN SAMPLE BY USING THE SAME

(71) Applicant: Samsung Electronics Co., Ltd., Suwon-si (KR)

(72) Inventors: Yu Kyung Jung, Hwaseong-si (KR); Woo Yong Shim, Suwon-si (KR); Jae-Young Kim, Suwon-si (KR); Seung Hoon Song, Suwon-si (KR); Dongsik Yang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 214 days.

(21) Appl. No.: 17/224,596

(22) Filed: Apr. 7, 2021

(65) Prior Publication Data

US 2022/0162650 A1 May 26, 2022

(30) Foreign Application Priority Data

Nov. 25, 2020 (KR) .................. 10-2020-0160062

(51) Int. Cl.
  *C12P 1/04* (2006.01)
  *C12N 1/20* (2006.01)
  *C12N 9/06* (2006.01)
(52) U.S. Cl.
  CPC ............... *C12P 1/04* (2013.01); *C12N 1/20* (2013.01); *C12N 9/0044* (2013.01); *C12Y 107/02005* (2013.01)
(58) Field of Classification Search
  CPC .......... C12P 1/04; C12N 1/20; C12N 9/0044; C12Y 107/02005
  See application file for complete search history.

(56) References Cited

U.S. PATENT DOCUMENTS

| | | | |
|---|---|---|---|
| 6,136,588 A | 10/2000 | Bedzyk et al. | |
| 2009/0269801 A1 | 10/2009 | Gardner et al. | |
| 2012/0034668 A1 | 2/2012 | Stewart et al. | |

FOREIGN PATENT DOCUMENTS

| | | | | |
|---|---|---|---|---|
| CN | 102676430 A | * | 9/2012 | |
| CN | 103100293 A | | 5/2013 | |
| EP | 2504422 A1 | * | 10/2012 | ........... C07K 14/395 |

OTHER PUBLICATIONS

Baker, S. et al. Molecular Genetics of the Genus *Paracoccus*: Metabolically Versatile Bacteria with Bioenergetic Flexibility, 1998, Microbiology and Molecular Biology Reviews, 62(4): 1046-1078; https://journals.asm.org/doi/epub/10.1128/MMBR.62.4.1046-1078. 1998 (Year: 1198).*

Murai, K. et al. Cloning and Nucleotide Sequence of the Nitric Oxide Reductase Locus in Paracoccus denitrificans IFO 12442, 1998 , Journal of Fermentation and Bioengineering, 86(5): 494-499 (Year: 1998).*

Casciotti, K. et al. Phylogenetic analysis of nitric oxide reductase gene homologues from aerobic ammonia-oxidizing bacteria, 2005, FEMS Microbiology Ecology, 52: 197-205 (Year: 2005).*

De Boer, A. et al. Mutational analysis of the nor gene cluster which encodes nitric-oxide reductase from Paracoccus denitrificans, 1996, European Journal of Biochemistry, 242: 592-600 (Year: 1996).*

Field, S. et al. Chapter 5—The Respiratory Nitric Oxide Reductase (NorBC) from Paracoccus denitrificans, 2008, Methods in Enzymology, Editor Robert K. Poole, 437: 79-101, https://doi.org/10.1016/S0076-6879(07)37005-5 (Year: 2008).*

Brenda Enzyme Database, Nitric Oxide Reductase (Cytochrome C), https://www.brenda-enzymes.org/sequences.php?ID=32819476 (Year: 2024).*

Alice C. Ind, et al., "Inducible-Expression Plasmid for Rhodobacter sphaeroides and Paracoccus denitrificans," Applied and Environmental Microbiology, Oct. 2009, vol. 75, No. 20, pp. 6613-6615.

Isabella Manconi, et al., "Effect of sulfur compounds on biological reduction of nitric oxide in aqueous Fe(II)EDTA2," Nitric Oxide, Mar. 6, 2006, vol. 15, pp. 40-49.

Kirill A. Datsenko, et al., "One-step inactivation of chromosomal genes in *Escherichia coli* K-12 using PCR products," PNAS, Jun. 6, 2000, vol. 97, No. 12, pp. 6640-6645.

Rajkumari Kumaraswamy, et al., "Characterization of Microbial Communities Removing Nitrogen Oxides from Flue Gas: the BioDeNOx Process," Applied and Environmental Microbiology, Oct. 2005, vol. 71, No. 10, pp. 6345-6352.

Wei Li et al., "Pathway of FeEDTA transformation and its impact on performance of NOx removal in a chemical absorption-biological reduction integrated process," Scientific Reports, Jan. 8, 2016, pp. 1-10.

Blombach et al., "Current knowledge on isobutanol production with *Escherichia coli*, Bacillus subtilis and Corynebacterium glutamicum", Bioengineered Bugs 2:6, 346-350, Nov./Dec. 2011.

Hazelwood et al., "The Ehrlich Pathway for Fusel Alcohol Production: a Century of Research on *Saccharomyces cerevisiae* Metabolism", Applied and Environmental Microbiology, Apr. 2008, vol. 74, No. 8, p. 2259-2266.

(Continued)

*Primary Examiner* — Louise W Humphrey
(74) *Attorney, Agent, or Firm* — CANTOR COLBURN LLP

(57) ABSTRACT

A recombinant microorganism including a genetic modification that increases activity of nitric oxide reductase in the recombinant microorganism, a composition for reducing a concentration of nitric oxide in a sample, the composition including the recombinant microorganism, and a method of reducing a concentration of nitric oxide in a sample, are disclosed.

10 Claims, 3 Drawing Sheets

Specification includes a Sequence Listing.

(56) References Cited

OTHER PUBLICATIONS

Tsuruta et al., "Denitrification by yeasts and occurrence of cytochrome P450nor in Trichosporon cutaneum", FEMS Microbiology Letters, 168 (1998), 105-110.
Raika Yamagiwa et al., "Pseudomonas aeruginosa overexpression system of nitric oxide reductase for in vivo and in vitro mutational analyses," Biochim. Biophys. Acta Bioenerg., 1859(5), 333-341 (May 2018).
Office Action issued Sep. 26, 2025 of KR Patent Application No. 10-2020-0160062.

\* cited by examiner

```
                              SEQUENCE LISTING

<160> NUMBER OF SEQ ID NOS: 21

<210> SEQ ID NO 1
<211> LENGTH: 479
<212> TYPE: PRT
<213> ORGANISM: Escherichia coli

<400> SEQUENCE: 1

Met Ser Ile Val Val Lys Asn Asn Ile His Trp Val Gly Gln Arg Asp
1               5                   10                  15

Trp Glu Val Arg Asp Phe His Gly Thr Glu Tyr Lys Thr Leu Arg Gly
            20                  25                  30

Ser Ser Tyr Asn Ser Tyr Leu Ile Arg Glu Glu Lys Asn Val Leu Ile
        35                  40                  45

Asp Thr Val Asp His Lys Phe Ser Arg Glu Phe Val Gln Asn Leu Arg
    50                  55                  60

Asn Glu Ile Asp Leu Ala Asp Ile Asp Tyr Ile Val Ile Asn His Ala
65                  70                  75                  80

Glu Glu Asp His Ala Gly Ala Leu Thr Glu Leu Met Ala Gln Ile Pro
                85                  90                  95

Asp Thr Pro Ile Tyr Cys Thr Ala Asn Ala Ile Asp Ser Ile Asn Gly
            100                 105                 110

His His His His Pro Glu Trp Asn Phe Asn Val Val Lys Thr Gly Asp
        115                 120                 125

Thr Leu Asp Ile Gly Asn Gly Lys Gln Leu Ile Phe Val Glu Thr Pro
    130                 135                 140

Met Leu His Trp Pro Asp Ser Met Met Thr Tyr Leu Thr Gly Asp Ala
145                 150                 155                 160

Val Leu Phe Ser Asn Asp Ala Phe Gly Gln His Tyr Cys Asp Glu His
                165                 170                 175

Leu Phe Asn Asp Glu Val Asp Gln Thr Glu Leu Phe Glu Gln Cys Gln
            180                 185                 190

Arg Tyr Tyr Ala Asn Ile Leu Thr Pro Phe Ser Arg Leu Val Thr Pro
        195                 200                 205

Lys Ile Thr Glu Ile Leu Gly Phe Asn Leu Pro Val Asp Met Ile Ala
    210                 215                 220

Thr Ser His Gly Val Val Trp Arg Asp Asn Pro Thr Gln Ile Val Glu
225                 230                 235                 240

Leu Tyr Leu Lys Trp Ala Ala Asp Tyr Gln Glu Asp Arg Ile Thr Ile
                245                 250                 255

Phe Tyr Asp Thr Met Ser Asn Asn Thr Arg Met Met Ala Asp Ala Ile
            260                 265                 270

Ala Gln Gly Ile Ala Glu Thr Asp Pro Arg Val Ala Val Lys Ile Phe
        275                 280                 285

Asn Val Ala Arg Ser Asp Lys Asn Glu Ile Leu Thr Asn Val Phe Arg
    290                 295                 300

Ser Lys Gly Val Leu Val Gly Thr Ser Thr Met Asn Asn Val Met Met
305                 310                 315                 320

Pro Lys Ile Ala Gly Leu Val Glu Met Thr Gly Leu Arg Phe Arg
                325                 330                 335

Asn Lys Arg Ala Ser Ala Phe Gly Ser His Gly Trp Ser Gly Gly Ala
            340                 345                 350
```

Val Asp Arg Leu Ser Thr Arg Leu Gln Asp Ala Gly Phe Glu Met Ser
            355                 360                 365

Leu Ser Leu Lys Ala Lys Trp Arg Pro Asp Gln Asp Ala Leu Lys Leu
    370                 375                 380

Cys Arg Glu His Gly Arg Glu Ile Ala Arg Gln Trp Ala Leu Ala Pro
385                 390                 395                 400

Leu Pro Gln Ser Thr Val Asn Thr Val Val Lys Glu Glu Thr Ser Ala
                405                 410                 415

Thr Thr Thr Ala Asp Leu Gly Pro Arg Met Gln Cys Ser Val Cys Gln
            420                 425                 430

Trp Ile Tyr Asp Pro Ala Lys Gly Glu Pro Met Gln Asp Val Ala Pro
            435                 440                 445

Gly Thr Pro Trp Ser Glu Val Pro Asp Asn Phe Leu Cys Pro Glu Cys
        450                 455                 460

Ser Leu Gly Lys Asp Val Phe Glu Glu Leu Ala Ser Glu Ala Lys
465                 470                 475

<210> SEQ ID NO 2
<211> LENGTH: 377
<212> TYPE: PRT
<213> ORGANISM: Escherichia coli

<400> SEQUENCE: 2

Met Ser Asn Gly Ile Val Ile Ile Gly Ser Gly Phe Ala Ala Arg Gln
1               5                   10                  15

Leu Val Lys Asn Ile Arg Lys Gln Asp Ala Thr Ile Pro Leu Thr Leu
            20                  25                  30

Ile Ala Ala Asp Ser Met Asp Glu Tyr Asn Lys Pro Asp Leu Ser His
        35                  40                  45

Val Ile Ser Gln Gly Gln Arg Ala Asp Asp Leu Thr Arg Gln Thr Ala
    50                  55                  60

Gly Glu Phe Ala Glu Gln Phe Asn Leu His Leu Phe Pro Gln Thr Trp
65                  70                  75                  80

Val Thr Asp Ile Asp Ala Glu Ala Arg Val Val Lys Ser Gln Asn Asn
                85                  90                  95

Gln Trp Gln Tyr Asp Lys Leu Val Leu Ala Thr Gly Ala Ser Ala Phe
            100                 105                 110

Val Pro Pro Val Pro Gly Arg Glu Leu Met Leu Thr Leu Asn Ser Gln
        115                 120                 125

Gln Glu Tyr Arg Ala Cys Glu Thr Gln Leu Arg Asp Ala Arg Arg Val
    130                 135                 140

Leu Ile Val Gly Gly Gly Leu Ile Gly Ser Glu Leu Ala Met Asp Phe
145                 150                 155                 160

Cys Arg Ala Gly Lys Ala Val Thr Leu Ile Asp Asn Ala Ala Ser Ile
                165                 170                 175

Leu Ala Ser Leu Met Pro Pro Glu Val Ser Ser Arg Leu Gln His Arg
            180                 185                 190

Leu Thr Glu Met Gly Val His Leu Leu Leu Lys Ser Gln Leu Gln Gly
        195                 200                 205

Leu Glu Lys Thr Asp Ser Gly Ile Gln Ala Thr Leu Asp Arg Gln Arg
    210                 215                 220

Asn Ile Glu Val Asp Ala Val Ile Ala Ala Thr Gly Leu Arg Pro Glu
225                 230                 235                 240

Thr Ala Leu Ala Arg Arg Ala Gly Leu Thr Ile Asn Arg Gly Val Cys
                245                 250                 255

-continued

Val Asp Ser Tyr Leu Gln Thr Ser Asn Thr Asp Ile Tyr Ala Leu Gly
            260                 265                 270

Asp Cys Ala Glu Ile Asn Gly Gln Val Leu Pro Phe Leu Gln Pro Ile
            275                 280                 285

Gln Leu Ser Ala Met Val Leu Ala Lys Asn Leu Leu Gly Asn Asn Thr
            290                 295                 300

Pro Leu Lys Leu Pro Ala Met Leu Val Lys Ile Lys Thr Pro Glu Leu
305                 310                 315                 320

Pro Leu His Leu Ala Gly Glu Thr Gln Arg Gln Asp Leu Arg Trp Gln
            325                 330                 335

Ile Asn Thr Glu Arg Gln Gly Met Val Ala Arg Gly Val Asp Asp Ala
            340                 345                 350

Asp Gln Leu Arg Ala Phe Val Val Ser Glu Asp Arg Met Lys Glu Ala
            355                 360                 365

Phe Gly Leu Leu Lys Thr Leu Pro Met
            370                 375

<210> SEQ ID NO 3
<211> LENGTH: 462
<212> TYPE: PRT
<213> ORGANISM: Paracoccus versutus DSM 582

<400> SEQUENCE: 3

Met Arg Tyr His Ser Gln Arg Ile Ala Tyr Ala Tyr Phe Leu Val Ala
1               5                   10                  15

Met Ala Leu Phe Ala Val Gln Val Ile Phe Gly Leu Ile Met Gly Trp
            20                  25                  30

Ile Tyr Val Ser Pro Asn Phe Leu Ser Glu Leu Leu Pro Phe Asn Ile
            35                  40                  45

Ala Arg Met Leu His Thr Asn Ser Leu Val Val Trp Leu Leu Leu Gly
        50                  55                  60

Phe Phe Gly Ala Thr Tyr Tyr Ile Leu Pro Glu Ala Glu Arg Glu
65                  70                  75                  80

Ile His Ser Pro Met Leu Ala Tyr Ile Gln Leu Gly Ile Phe Val Leu
                85                  90                  95

Gly Thr Leu Gly Val Val Val Thr Tyr Leu Phe Asp Leu Phe His Gly
            100                 105                 110

His Trp Leu Leu Gly Lys Glu Gly Arg Glu Phe Leu Glu Gln Pro Lys
        115                 120                 125

Trp Val Lys Val Gly Ile Ala Val Ala Ala Val Ile Phe Met Tyr Asn
130                 135                 140

Val Ser Met Thr Ala Leu Lys Gly Arg Arg Thr Ala Val Thr Asn Val
145                 150                 155                 160

Leu Leu Met Gly Leu Trp Gly Leu Val Leu Leu Trp Leu Phe Ala Phe
                165                 170                 175

Tyr Asn Pro Ala Asn Leu Val Leu Asp Lys Gln Tyr Trp Trp Trp Val
            180                 185                 190

Ile His Leu Trp Val Glu Gly Val Trp Glu Leu Ile Met Ala Ala Ile
        195                 200                 205

Leu Ala Phe Leu Met Leu Lys Leu Thr Gly Val Asp Arg Glu Val Val
        210                 215                 220

Glu Lys Trp Leu Tyr Val Ile Val Ala Thr Ala Leu Phe Ser Gly Ile
225                 230                 235                 240

Leu Gly Thr Gly His His Tyr Tyr Trp Ile Gly Leu Pro Ala Tyr Trp

```
                    245                 250                 255
Gln Trp Ile Gly Ser Ile Phe Ser Ser Phe Glu Ile Val Pro Phe Phe
                260                 265                 270

Ala Met Met Ser Phe Ala Phe Val Met Val Trp Lys Gly Arg Arg Asp
            275                 280                 285

His Pro Asn Lys Ala Ala Leu Val Trp Ser Leu Gly Cys Thr Val Leu
        290                 295                 300

Ala Phe Phe Gly Ala Gly Val Trp Gly Phe Leu His Thr Leu His Gly
305                 310                 315                 320

Val Asn Tyr Tyr Thr His Gly Thr Gln Ile Thr Ala Ala His Gly His
                325                 330                 335

Leu Ala Phe Tyr Gly Ala Tyr Val Cys Leu Val Leu Ala Leu Val Thr
            340                 345                 350

Tyr Cys Met Pro Leu Met Lys Asn Arg Asp Pro Tyr Asn Gln Val Leu
        355                 360                 365

Asn Met Ala Ser Phe Trp Leu Met Ser Ser Gly Met Val Phe Met Thr
    370                 375                 380

Val Thr Leu Thr Phe Ala Gly Thr Val Gln Thr His Leu Gln Arg Val
385                 390                 395                 400

Glu Gly Gly Phe Phe Met Asp Val Gln Asp Gly Leu Ala Leu Phe Tyr
                405                 410                 415

Trp Met Arg Phe Gly Ser Gly Val Ala Val Leu Gly Ala Leu Leu
            420                 425                 430

Phe Ile Tyr Ala Val Leu Phe Pro Arg Arg Glu Val Val Thr Ala Gly
        435                 440                 445

Pro Val Gln Ala His Lys Asp Gly His Leu Glu Ala Ala Glu
    450                 455                 460

<210> SEQ ID NO 4
<211> LENGTH: 150
<212> TYPE: PRT
<213> ORGANISM: Paracoccus versutus DSM 582

<400> SEQUENCE: 4

Met Ser Glu Ile Met Thr Lys Asn Met Ala Arg Asn Val Phe Tyr Gly
1               5                   10                  15

Gly Ser Ile Phe Phe Ile Leu Ile Phe Gly Ala Leu Thr Val His Ser
            20                  25                  30

His Ile Tyr Ala Arg Thr Lys Ala Val Asp Glu Ser Gln Leu Thr Pro
        35                  40                  45

Ser Val Ala Glu Gly Lys His Ile Trp Glu Arg Asn Ala Cys Ile Asp
    50                  55                  60

Cys His Thr Ile Leu Gly Glu Gly Ala Tyr Phe Ala Pro Glu Leu Gly
65                  70                  75                  80

Asn Val Met Lys Arg Trp Gly Val Gln Asp Asp Pro Glu Ser Ala Phe
                85                  90                  95

Glu Thr Leu Lys Gly Trp Met Glu Ser Met Pro Thr Gly Ile Glu Gly
            100                 105                 110

Arg Arg Gln Met Pro Arg Phe Asp Leu Thr Asp Glu Glu Phe Arg Ala
        115                 120                 125

Leu Ser Asp Phe Leu Leu Trp Thr Gly Thr Ile Asn Thr Gln Asn Trp
    130                 135                 140

Pro Pro Asn Asp Ala Gly
145                 150
```

<210> SEQ ID NO 5
<211> LENGTH: 1440
<212> TYPE: DNA
<213> ORGANISM: Escherichia coli

<400> SEQUENCE: 5

| | |
|---|---|
| atgtctattg tggtgaaaaa taacattcat tgggttggtc aacgtgactg ggaagtgcgt | 60 |
| gattttcacg gcacggaata taaaacgctg cgcggcagca gctacaatag ctacctcatc | 120 |
| cgcgaagaaa aaaacgtgct gatcgacacc gtcgaccata aattcagccg cgaatttgtg | 180 |
| cagaacctgc gtaatgaaat cgatctggcg gatatcgatt acatcgtgat taaccatgca | 240 |
| gaagaggacc acgctggggc gctgaccgaa ctgatggcac aaattcccga tacgccgatc | 300 |
| tactgtacag ccaacgctat cgactcgata aatggtcatc accatcatcc ggagtggaat | 360 |
| tttaatgtgg tgaaaactgg cgacacgctg gatatcggca acggcaaaca gctcattttt | 420 |
| gtcgaaacac caatgctgca ctggccggac agcatgatga cttacctgac aggcgacgcg | 480 |
| gtgctgttca gtaacgatgc tttcggtcaa cactactgcg acgagcatct gttcaacgat | 540 |
| gaagtggatc agacggagct tttcgagcag tgccagcgtt actacgccaa tatcctgacg | 600 |
| ccgttcagcc gcctggtaac accgaaaatt accgagatcc tgggctttaa cttaccagtc | 660 |
| gatatgatag ccacttccca cggcgtggta tggcgcgata cccgacgca aattgtcgag | 720 |
| ctgtacctga atgggcggc tgattatcag gaagacagaa tcaccattt ctacgacacc | 780 |
| atgtcgaata cacccgcat gatggctgac gctatcgccc aggggattgc ggaaaccgac | 840 |
| ccacgcgtgg cggtgaaaat ttcaacgtc gcccgaagcg ataaaaacga atcctgact | 900 |
| aatgtcttcc gctcaaaagg cgtgctggtc ggcacttcga cgatgaataa cgtgatgatg | 960 |
| ccgaaaatcg ccgggctggt ggaggagatg actggtttac gcttccgtaa caaacgcgcc | 1020 |
| agtgctttcg gctctcacgg ctggagcggc ggtgcggtgg atcgtctttc cacgcgcctg | 1080 |
| caggatgcgg gtttcgaaat gtcgcttagc ctgaaagcga aatggcgacc agaccaggac | 1140 |
| gctctgaagt tatgccgtga acacggtcgc gaaatcgccc gtcagtgggc gctcgcgccg | 1200 |
| ctgccgcaga gcacggtgaa tacgtagtt aaagaagaaa cctctgccac cacgacggct | 1260 |
| gacctcggcc cacggatgca gtgcagcgtc tgccagtgga tttacgatcc ggcaaaaggc | 1320 |
| gagccaatgc aggacgttgc gccaggaacg ccgtggagtg aagtcccgga taacttcctc | 1380 |
| tgcccggaat gctccctcgg caaagacgtc tttgaagaac tggcatcgga ggcaaaatga | 1440 |

<210> SEQ ID NO 6
<211> LENGTH: 1134
<212> TYPE: DNA
<213> ORGANISM: Escherichia coli

<400> SEQUENCE: 6

| | |
|---|---|
| atgagtaacg gcattgtgat catcggttcg ggcttcgccg cccgccaact ggtgaaaaat | 60 |
| attcgcaaac aggacgccac tattccatta accctgattg ccgccgacag catggatgag | 120 |
| tacaacaaac ctgacctcag ccatgttatc agtcaggggc aacgtgccga tgaccttacc | 180 |
| cgccagacgg cgggtgaatt tgccgagcag tttaatctgc acctgttcc acaaacctgg | 240 |
| gtgacggata tcgatgccga agcccgtgtg gtgaaaagcc agaataatca gtggcaatac | 300 |
| gacaagctag tactggcaac cggtgccagt gcctttgtcc cgcctgtgcc tgggcgtgag | 360 |
| ttaatgctga cgttaaatag tcagcaagag tatcgcgcct gtgaaacgca actgcgggat | 420 |
| gcccgacgcg tgttgattgt tggcggtggt ttgattggta gcgaactggc gatggatttt | 480 |

```
tgtcgtgcag gcaaagcggt cacgctaatc gacaacgctg ccagtattct ggcgtcgtta      540
atgccaccgg aagtaagcag ccgcttgcag catcggttga cggagatggg cgttcatctg      600
ctgttgaaat ctcagttaca ggggctggaa aaaacggatt ctggcattca ggcaacgctg      660
gaccgccagc gcaatatcga agtggatgcg gtaattgccg ccaccggact gcgcccggaa      720
accgccctgg cacgacgcgc cgggctgacg attaatcgcg gcgtttgcgt cgatagttat      780
ctgcaaacca gtaataccga tatttacgcg ctgggcgatt gcgcggaaat taacggtcag      840
gtattgccgt tcctccagcc gattcaactt agcgcgatgg tgctggcaaa aaatcttctc      900
ggcaataaca cgccgctgaa actcccggcg atgctggtga aaatcaaaac gccggaatta      960
ccgctgcatc tggcaggcga acccagcgt caggatttac gctggcaaat taataccgaa     1020
cgccagggaa tggtggcgcg cggcgttgac gatgctgacc agcttcgcgc ctttgtggtc     1080
agtgaggatc ggatgaaaga ggcatttgga ttgttgaaaa cattgccgat gtag          1134
```

<210> SEQ ID NO 7
<211> LENGTH: 1389
<212> TYPE: DNA
<213> ORGANISM: Paracoccus versutus DSM 582

<400> SEQUENCE: 7

```
atgagatacc attcgcaacg catcgcctat gcctatttcc tggtggccat ggcgcttttc       60
gccgttcagg tgattttcgg cctgatcatg ggctggatct atgtcagccc gaatttcctg      120
tccgaattgc tgccctttaa tatcgcgcgg atgctgcata ccaacagcct ggtcgtctgg      180
ctgctcttgg gcttttttcgg cgcgacctat tacatcctgc ccgaagaggc cgagcgcgaa      240
atccattcgc cgatgctggc ctatatccag ctgggcattt tcgtgctggg cacgctgggc      300
gtggtcgtga cctatctgtt cgaccttttc catggccatt ggcttttggg caaggagggg      360
cgcgagttcc tggaacaacc gaaatgggtc aaggtcggca tcgccgtggc cgcggtgatc      420
ttcatgtaca acgtcagcat gaccgcgctg aagggccggc ggacggcggt cacgaacgtg      480
ctgctgatgg gcctgtgggg gctggtgctg ctgtggctct ttgccttcta caacccggcg      540
aacctggtcc tcgacaagca atactggtgg tgggtgatcc acctgtgggt cgagggcgtg      600
tgggagctga tcatggccgc catcctcgcc ttcctgatgc tcaagctgac cggcgtggac      660
cgcgaggtgg tcgagaaatg gctttacgtc atcgtcgcca cggcgctgtt ctcgggcatc      720
ctgggcaccg gcaccacta ctactggatc ggcctgccgg cctattggca gtggatcggc      780
tcgatcttct cgagcttcga gatcgtgccc ttcttcgcga tgatgtcctt tgccttcgtc      840
atggtctgga agggccggcg cgaccacccg aacaaggcgg cgctggtctg gagcctgggc      900
tgcaccgtgc tggccttctt cggggccggg gtctggggct tcctgcacac gctgcacggg      960
gtgaactact atacccacgg cacgcagatc accgccgcgc atggccacct ggccttctat     1020
ggcgcctatg tctgcctggt gctggcgctg gtgacctatt gcatgccgct gatgaagaac     1080
cgcgacccct acaaccaggt gctgaacatg gcctcgttct ggctgatgtc ctcgggcatg     1140
gtgttcatga cggtgacgct gaccttcgcc ggcacggtgc agacccatct gcagcgggtc     1200
gagggcgggt tcttcatgga cgtgcaggac gggctggcgc tgttctactg gatgcgcttc     1260
ggctcgggcg tcgcggtggt gctgggcgcg ctgctcttca tctatgcggt gctgttcccg     1320
cgccgcgagg tggtcacagc cggccccgtg caggcgcaca aggacggcca cctggaggct     1380
gcggagtaa                                                            1389
```

<210> SEQ ID NO 8
<211> LENGTH: 453
<212> TYPE: DNA
<213> ORGANISM: Paracoccus versutus DSM 582

<400> SEQUENCE: 8

```
atgagcgaaa tcatgaccaa gaacatggcc cggaacgtct tctacggcgg gtccatattc    60
ttcatcctga tctttggcgc gttaaccgtg catagccata tctatgcccg caccaaggca   120
gtggatgaaa gccagctcac ccctcggtc gccgagggca agcatatctg gaacgcaac    180
gcctgcattg actgccatac catcctgggc gagggcgcct atttcgcccc cgagcttggc   240
aatgtgatga acgctgggg cgtgcaggat gatcccgaat ccgccttcga gacgctgaag   300
ggctggatgg aatccatgcc caccggaatc gagggtcgcc gccagatgcc ccgcttcgat   360
ctgacggacg aggaattccg ggcgctgtcg gatttcctgc tgtggaccgg cacgatcaac   420
acccagaact ggccaccgaa cgacgcgggc tga                               453
```

<210> SEQ ID NO 9
<211> LENGTH: 70
<212> TYPE: DNA
<213> ORGANISM: Artificial
<220> FEATURE:
<223> OTHER INFORMATION: primer

<400> SEQUENCE: 9

```
gcaattagca agacatcttt ttagaacacg ctgaataaat tgaggttgct gtgtaggctg    60
gagctgcttc                                                           70
```

<210> SEQ ID NO 10
<211> LENGTH: 70
<212> TYPE: DNA
<213> ORGANISM: Artificial
<220> FEATURE:
<223> OTHER INFORMATION: primer

<400> SEQUENCE: 10

```
ggataagacg cgccagcgtc gcatccgaca ttttaggcac agtagcccac catatgaata    60
tcctccttag                                                           70
```

<210> SEQ ID NO 11
<211> LENGTH: 20
<212> TYPE: DNA
<213> ORGANISM: Artificial
<220> FEATURE:
<223> OTHER INFORMATION: primer

<400> SEQUENCE: 11

```
tcatctttgc ctcactgtca                                                20
```

<210> SEQ ID NO 12
<211> LENGTH: 20
<212> TYPE: DNA
<213> ORGANISM: Artificial
<220> FEATURE:
<223> OTHER INFORMATION: primer

<400> SEQUENCE: 12

```
gaagtccaga acggataaaa                                                20
```

<210> SEQ ID NO 13
<211> LENGTH: 38

```
<212> TYPE: DNA
<213> ORGANISM: Artificial
<220> FEATURE:
<223> OTHER INFORMATION: primer

<400> SEQUENCE: 13
taaagaggag aaattaacca tgtctattgt ggtgaaaa                              38

<210> SEQ ID NO 14
<211> LENGTH: 39
<212> TYPE: DNA
<213> ORGANISM: Artificial
<220> FEATURE:
<223> OTHER INFORMATION: primer

<400> SEQUENCE: 14
ccaagctcag ctaattaagc ttacatcggc aatgttttc                             39

<210> SEQ ID NO 15
<211> LENGTH: 38
<212> TYPE: DNA
<213> ORGANISM: Artificial
<220> FEATURE:
<223> OTHER INFORMATION: primer

<400> SEQUENCE: 15
ttttcaccac aatagacatg gttaatttct cctcttta                              38

<210> SEQ ID NO 16
<211> LENGTH: 39
<212> TYPE: DNA
<213> ORGANISM: Artificial
<220> FEATURE:
<223> OTHER INFORMATION: primer

<400> SEQUENCE: 16
gaaaacattg ccgatgtaag cttaattagc tgagcttgg                             39

<210> SEQ ID NO 17
<211> LENGTH: 39
<212> TYPE: DNA
<213> ORGANISM: Artificial
<220> FEATURE:
<223> OTHER INFORMATION: primer

<400> SEQUENCE: 17
taaagaggag aaattaacca tgagcgaaat catgaccaa                             39

<210> SEQ ID NO 18
<211> LENGTH: 39
<212> TYPE: DNA
<213> ORGANISM: Artificial
<220> FEATURE:
<223> OTHER INFORMATION: primer

<400> SEQUENCE: 18
ccaagctcag ctaattaagc ttactccgca gcctccagg                             39

<210> SEQ ID NO 19
<211> LENGTH: 39
<212> TYPE: DNA
<213> ORGANISM: Artificial
<220> FEATURE:
<223> OTHER INFORMATION: primer

<400> SEQUENCE: 19
```

```
ttggtcatga tttcgctcat ggttaatttc tcctctttta                          39

<210> SEQ ID NO 20
<211> LENGTH: 39
<212> TYPE: DNA
<213> ORGANISM: Artificial
<220> FEATURE:
<223> OTHER INFORMATION: primer

<400> SEQUENCE: 20
cctggaggct gcggagtaag cttaattagc tgagcttgg                           39

<210> SEQ ID NO 21
<211> LENGTH: 1854
<212> TYPE: DNA
<213> ORGANISM: Artificial
<220> FEATURE:
<223> OTHER INFORMATION: A nucleotide sequence for norCB gene

<400> SEQUENCE: 21
atgagcgaaa tcatgaccaa gaacatggcc cggaacgtct tctacggcgg gtccatattc    60
ttcatcctga tctttggcgc gttaaccgtg catagccata tctatgcccg caccaaggca   120
gtggatgaaa gccagctcac ccctcggtc gccgagggca agcatatctg ggaacgcaac    180
gcctgcattg actgccatac catcctgggc gagggcgcct atttcgcccc cgagcttggc   240
aatgtgatga acgctggggg cgtgcaggat gatcccgaat ccgccttcga gacgctgaag   300
ggctggatgg aatccatgcc caccggaatc gagggtcgcc gccagatgcc ccgcttcgat   360
ctgacggacg aggaattccg ggcgctgtcg gatttcctgc tgtggaccgg cacgatcaac   420
acccagaact ggccaccgaa cgacgcgggc tgaggggggaa aaccgatgag ataccattcg   480
caacgcatcg cctatgccta tttcctggtg gccatgcgc ttttcgccgt tcaggtgatt    540
ttcggcctga tcatgggctg gatctatgtc agcccgaatt tcctgtccga attgctgccc   600
tttaatatcg cgcggatgct gcataccaac agcctggtcg tctggctgct cttgggcttt   660
ttcggcgcga cctattacat cctgcccgaa gaggccgagc gcgaaatcca ttcgccgatg   720
ctggcctata tccagctggg cattttcgtg ctgggcacgc tgggcgtggt cgtgaccta    780 ctgttcgacc ttttccatgg ccattggctt ttgggcaagg aggggcgcga gttcctggaa   840
caaccgaaat gggtcaaggt cggcatcgcc gtggccgcgg tgatcttcat gtacaacgtc   900
agcatgaccg cgctgaaggg ccggcggacg gcggtcacga acgtgctgct gatgggcctg   960
tgggggctgg tgctgctgtg gctctttgcc ttctacaacc cggcgaacct ggtcctcgac  1020
aagcaatact ggtggtgggt gatccacctg tgggtcgagg gcgtgtggga gctgatcatg  1080
gccgccatcc tcgccttcct gatgctcaag ctgaccggcg tggaccgcga ggtggtcgag  1140
aaatggcttt acgtcatcgt cgccacggcg ctgttctcgg gcatcctggg caccgggcac  1200
cactactact ggatcggcct gccggcctat tggcagtgga tcggctcgat cttctcgagc  1260
ttcgagatcg tgcccttctt cgcgatgatg tcctttgcct tcgtcatggt ctggaagggc  1320
cggcgcgacc acccgaacaa ggcggcgctg gtctggagcc tgggctgcac cgtgctggcc  1380
ttcttcgggg ccggggtctg gggcttcctg cacacgctgc acggggtgaa ctactatacc  1440
cacggcacgc agatcaccgc cgcgcatggc cacctggcct tctatggcgc ctatgtctgc  1500
ctggtgctgg cgctggtgac ctattgcatg ccgctgatga agaaccgcga ccctacaac   1560 caggtgctga acatggcctc gttctggctg atgtcctcgg gcatggtgtt catgacggtg  1620
acgctgacct tcgccggcac ggtgcagacc catctgcagc gggtcgaggg cgggttcttc  1680
```

```
atggacgtgc aggacgggct ggcgctgttc tactggatgc gcttcggctc gggcgtcgcg    1740
gtggtgctgg gcgcgctgct cttcatctat gcggtgctgt tcccgcgccg cgaggtggtc    1800
acagccggcc cggtgcaggc gcacaaggac ggccacctgg aggctgcgga gtaa          1854
```

RECOMBINANT MICROORGANISM INCLUDING GENETIC MODIFICATION THAT INCREASES ACTIVITY OF NITRIC OXIDE REDUCTASE AND METHOD OF REDUCING CONCENTRATION OF NITRIC OXIDE IN SAMPLE BY USING THE SAME

CROSS-REFERENCE TO RELATED APPLICATION

This application is based on and claims priority to Korean Patent Application No. 10-2020-0160062, filed on Nov. 25, 2020, in the Korean Intellectual Property Office, and all the benefits accruing therefrom under 35 U.S.C. § 119, the content of which in its entirety is herein incorporated by reference.

BACKGROUND

1. Field

The present disclosure relates to a recombinant microorganism including a genetic modification that increases activity of nitric oxide reductase, a composition including the recombinant microorganism for use in reducing a concentration of nitric oxide in a sample, and a method of reducing a concentration of nitric oxide in a sample.

2. Description of the Related Art

Nitrogen oxide (NOx) is an air pollutant mainly emitted during a combustion process of fuels. Nitrogen oxide includes $N_2O$, $NO$, $N_2O_3$, $NO_2$, $N_2O_4$, $N_2O_5$, etc. Among the nitrogen oxides, $NO$ and $NO_2$ mainly cause air pollution. $N_2O$, along with carbon dioxide ($CO_2$), methane ($CH_4$), and Freon gas (CFCs), absorbs and stores heat in the atmosphere, causing a greenhouse effect. $N_2O$ is one of the six major greenhouse gases regulated by the Kyoto Protocol. $N_2O$ has a global warming potential (GWP) of 310, and its warming effect per unit mass is higher than that of carbon dioxide and methane. In addition, nitrogen oxides are also the cause of smog and acid rain. Nitrogen oxides produce secondary fine particulate matter through chemical reactions in the air, and increases concentrations of ground-level ozone, which adversely affects respiratory health.

In most nitrogen oxide removal processes, technologies such as selective catalytic reduction (SCR), selective non-catalytic reduction (SNCR), and scrubbing and adsorption, which are chemical reduction methods, are employed. Chemical methods have problems such as energy and catalyst costs required in the entire process, as well as treatment of secondary wastes generated therefrom. In addition, SCR or SNCR may generate $N_2O$, which is another greenhouse gas, as a result of incomplete reduction in the process of reducing $NO$ and $N_2O$. Unlike the chemical technologies, biological processes are environmentally friendly processes that have advantages such as relatively simple principles, no use of extreme conditions such as high temperature and high pressure, and low generation of secondary waste or wastewater. In a biological process, a microorganism acting as a biological catalyst may be used, instead of a chemical catalyst, to oxidize or reduce NOx or to fix it as a part of a cell.

However, there remains a need for an alternative method such as a biological denitrification method using a microorganism.

SUMMARY

Denitrifying bacteria reduce nitrogen oxide to $N_2$ through a dissimilatory reductive process. Several recent studies have reported many denitrifying bacteria such as *Pseudomonas putida*, *Pseudomonas denitrificans*, *Pseudomonas stutzeri*, *Paracoccus denitrificans*, *Klebsiella pneumonia*, etc. Among them, the genus *Paracoccus* has been relatively much studied. *Paracoccus* is a Gram-negative bacterium belonging to the family Rhodobacteraceae. An alternative method such as a biological denitrification method using microorganisms such as bacteria of the genus *Escherichia* or the genus *Paracoccus* would be advantageous.

An aspect provides a recombinant microorganism including a genetic modification that increases activity of nitric oxide reductase (NOR) in the recombinant microorganism.

Another aspect provides a composition for reducing a concentration of nitric oxide in a sample, the composition including a recombinant microorganism including a genetic modification that increases activity of NOR in the recombinant microorganism.

Still another aspect provides a method of reducing a concentration of nitric oxide in a sample, the method including contacting the recombinant microorganism including a genetic modification that increases activity of NOR in the recombinant microorganism with the nitric oxide-containing sample and reducing the concentration of nitric oxide in the sample.

Additional aspects will be set forth in part in the description which follows and, in part, will be apparent from the description, or may be learned by practice of the presented embodiments of the disclosure.

The terms "increase in activity" or "increased activity", as used herein, refers to a detectable increase in the activity of a cell, a protein, or an enzyme. The "increase in activity" or "increased activity" means that an activity of a genetically modified (genetically engineered) cell, protein, or enzyme is greater than the activity of a comparative cell, protein, or enzyme of the same type, such as a cell, a protein, or an enzyme, that does not have a given genetic modification (e.g., original or "wild-type" cell, protein, or enzyme).

"Activity of a cell" may refer to an activity of a particular protein or enzyme of a cell. For example, an activity of a modified or engineered cell, protein, or enzyme may be increased by about 5% or more, about 10% or more, about 15% or more, about 20% or more, about 30% or more, about 50% or more, about 60% or more, about 70% or more, or about 100% or more relative to an activity of a non-engineered cell, protein, or enzyme of the same type, i.e., a wild-type cell, protein, or enzyme. An activity of a particular protein or enzyme in a cell may be increased by about 5% or more, about 10% or more, about 15% or more, about 20% or more, about 30% or more, about 50% or more, about 60% or more, about 70% or more, or about 100% or more relative to an activity of the same protein or enzyme in a parent cell, e.g., a non-engineered cell. A cell having an increased activity of a protein or an enzyme may be identified by using any suitable method in the art.

An increase in activity of an enzyme or a polypeptide may be achieved by an increase in the expression of a gene encoding the enzyme or the polypeptide or an increase in specific activity of the enzyme or the polypeptide. The increase in the expression of a gene encoding the enzyme or the polypeptide may be achieved by introduction of a gene (or polynucleotide) encoding the enzyme or the polypeptide into a cell, or by an increase in the copy number of the gene, or by introducing a mutation in the regulatory region of the gene. The microorganism into which the gene is introduced may include the gene endogenously or may not include the gene. The gene may be operably linked to a regulatory sequence that allows expression thereof, for example, a promoter, a polyadenylation region, or a combination thereof. The polynucleotide which is introduced externally or whose copy number is increased may be endogenous or exogenous. An endogenous gene refers to a gene which is naturally present in the genetic material included in a cell (e.g., microorganism). An exogenous gene refers to a gene that is not naturally present in a cell and is introduced into the cell from the outside of the cell. The introduced exogenous gene may be homologous or heterologous with respect to the host cell type into which the gene is introduced. The term "heterologous" means "not native" or "foreign".

A "copy number increase" may be caused by introduction or amplification of a gene, and may be achieved by genetically engineering a cell so that the cell includes a gene that does not exist in a non-engineered cell. The introduction of the gene may be mediated by a vehicle such as a vector. The introduction may be a transient introduction in which the gene is not integrated into a genome of the cell, or an introduction that results in integration of the gene into the genome of the cell. The introduction may be performed, for example, by introducing a vector into the cell, the vector including a polynucleotide encoding a target polypeptide, and then, replicating the vector in the cell, or by integrating the polynucleotide into the genome of the cell. The term "copy number increase" may be an increase in the copy number of a gene or genes encoding one or more polypeptides constituting a complex, and which together exhibit nitric oxide reductase activity.

The introduction of the gene may be performed via a known method, for example, transformation, transfection, or electroporation. The gene may be introduced with or without the use of a vehicle. The term "vehicle", as used herein, refers to a nucleic acid molecule that is able to deliver other nucleic acids linked thereto. In view of a nucleic acid sequence mediating introduction of a specific gene, a vehicle as used herein, is interpreted as being used interchangeably with a vector, a nucleic acid construct, or a cassette. The vector may include, for example, a plasmid vector, a virus-derived vector, but is not limited thereto. The plasmid includes a circular double-stranded DNA sequence to which additional DNA may be linked. The vector may include, for example, a plasmid expression vector, a virus expression vector, such as a replication-defective retrovirus, an adenovirus, an adeno-associated virus, or a combination thereof.

The genetic modifications disclosed herein may be performed by any suitable molecular biological method.

The term "parent cell" refers to an original cell prior to its genetic modification, for example, a non-genetically engineered cell of the same type as an engineered microorganism. With respect to a particular genetic modification, the "parent cell" may be a cell that lacks the particular genetic modification, but is identical in all other respects. Thus, the parent cell may be a cell that is used as a starting material to produce a genetically engineered microorganism having an increased activity of a given protein (e.g., a protein having an amino acid sequence identity of about 75% or greater with respect to unmodified nitric oxide reductase). The same comparison is also applied to other genetic modifications.

The term "gene", as used herein, refers to a polynucleotide encoding the information for expressing a particular protein, and may or may not include a 5'-non-coding regulatory sequence and/or a 3'-non-coding regulatory sequence.

The term "polynucleotide" as used herein refers to a polymeric form of nucleotides of any length that includes purine and pyrimidine bases. A polynucleotide may comprise natural nucleotides or chemically modified nucleotides, such as methylated nucleotides and nucleotide analogs.

A "polypeptide" is a polymer chain comprised of amino acid residue monomers which are joined together through amide bonds (peptide bonds). In general, a polypeptide may include at least 10, 20, 50, 100, 200, 500, or more amino acid residue monomers.

The term "sequence identity" of a polynucleotide or a polypeptide, as used herein, refers to a degree of identity between nucleotides of a polynucleotide sequence or amino acid residues of a polypeptide sequence, and is obtained after the sequences are aligned so as to obtain a best match in certain comparable regions. The sequence identity is a value that is measured by comparing two sequences in certain comparable regions via optimal alignment of the two sequences, in which portions of the sequences in the certain comparable regions may be added or deleted compared to the reference sequence. A percentage of sequence identity may be calculated by, for example, comparing two optimally aligned sequences in the entire comparable regions, determining the number of matching locations in which the same amino acids or nucleic acids appear, dividing the number of matching locations by the total number of locations in the compared regions (i.e., the size of a range), and multiplying the result of the division by 100% to obtain the percentage of the sequence identity. The percentage of the sequence identity may be determined using a sequence comparison program, for example, BLASTn™ (NCBI), BLASTp™ (NCBI), CLC Main Workbench (CLC bio), or MegAlign™ (DNASTAR Inc).

The term "genetic modification", as used herein, refers to an artificial alteration in a constitution or structure of a genetic material of a cell.

An aspect provides a recombinant microorganism including a genetic modification that increases activity of nitric oxide reductase (NOR) in the recombinant microorganism.

The nitric oxide reductase may be an enzyme that catalyzes a reduction conversion of nitric oxide to nitrous oxide. The reaction may catalyze the chemical reaction of Reaction Scheme 1:

2 nitric oxide+2H++2e−⇌nitrous oxide+H$_2$O    Reaction Scheme 1

In one exemplary embodiment, the nitric oxide may be in the form of Fe(II)(L)—NO. Fe(II)(L)—NO represents a complex formed by chelating a chelating agent L with Fe$^{2+}$ and NO. In the complex, L may be, for example, ethylenediamine, diethylenetriamine, triethylenetetramine, hexamethylenetetramine, N-(2-hydroxyethyl)ethylenediamine-triacetic acid (HEDTA), ethylenediaminetetraacetic acid (EDTA), iminodiacetic acid, nitrilo-triacetic acid (NTA), or diethylenetriaminepentaacetic acid (DTPA). Therefore, Fe(II)(L)—NO may be in a form in which a nitrogen oxide, such as N$_2$O, NO, N$_2$O$_3$, NO$_2$, N$_2$O$_4$ and N$_2$O$_5$, are modified to be soluble in an aqueous solution. The Fe(II)(L)—NO may be formed by bringing a Fe(II)(L)-containing aqueous solution into contact with a nitrogen oxide. The contacting may include mixing an aqueous medium with a liquid sample including nitrogen oxide or contacting an aqueous medium with a gaseous sample including nitrogen oxide.

However, the recombinant microorganism is not limited to this specific mechanism in reducing a concentration of nitric oxide in a sample.

In one exemplary embodiment, the nitric oxide reductase may be a flavodiiron protein (FDP), such as flavorubredoxin (FlRd). The enzyme flavorubredoxin may catalyze, for example, the chemical reaction of Reaction Scheme 2:

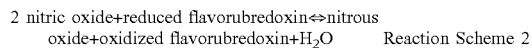

2 nitric oxide+reduced flavorubredoxin⇌nitrous
        oxide+oxidized flavorubredoxin+H$_2$O      Reaction Scheme 2

The nitric oxide reductase may be anaerobic nitric oxide reductase (NorV) derived from the genus *Escherichia*. In this case, the electron (2e−) of Reaction Scheme 1 may be in the form of reduced flavorubredoxin provided by NADH: flavorubredoxin reductase. The enzyme NADH: flavorubredoxin reductase may catalyze a chemical reaction of Reaction Scheme 3:

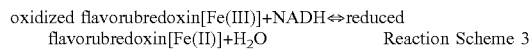

oxidized flavorubredoxin[Fe(III)]+NADH⇌reduced
        flavorubredoxin[Fe(II)]+H$_2$O      Reaction Scheme 3

The NADH: flavorubredoxin reductase may have the enzyme commissioner (EC) number EC 1.18.1.-. The enzyme NADH: flavorubredoxin reductase may be NorW derived from the genus *Escherichia*. The nitric oxide reductase may be in a form in which NorV receives electrons from the electron donor NADH through NorW and is reduced to convert nitric oxide to nitrous oxide. In this case, the electron (2e−) of Reaction Scheme 1 may be in the form of reduced flavorubredoxin.

In one exemplary embodiment, the nitric oxide reductase may be a cytochrome c dependent nitric oxide reductase (cNOR). The cNOR enzyme may catalyze, for example, a chemical reaction of:

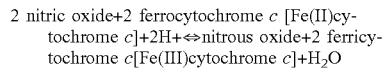

2 nitric oxide+2 ferrocytochrome *c* [Fe(II)cy-
        tochrome *c*]+2H+⇌nitrous oxide+2 ferricy-
        tochrome *c*[Fe(III)cytochrome *c*]+H$_2$O The cytochrome c dependent nitric oxide reductase may have the EC number EC 1.7.2.5. The enzyme may be cNOR (NorCB) derived from the genus *Paracoccus*. The cNOR may exist in a complex form including a NorB subunit and a NorC subunit, in which electrons are introduced through NorC and transferred to NorB having catalytic activity. NorC may include cytochrome c. In this case, the electron (2e−) of Reaction Scheme 1 may be in the form of reduced cytochrome c.

The nitric oxide reductase may be exogenous or endogenous. The nitric oxide reductase may be present in the cytoplasm or in the cell membrane of the recombinant microorganism. The nitric oxide reductase may include a nitric oxide reductase derived from the genus *Escherichia*, a nitric oxide reductase derived from the genus *Paracoccus*, or a combination thereof. The nitric oxide reductase may include a nitric oxide reductase derived from *Paracoccus versutus*, a nitric oxide reductase derived from *Escherichia coli*, or a combination thereof.

The nitric oxide reductase may include a polypeptide having 75% or greater, 80% or greater, 85% or greater, 90% or greater, or 95% or greater sequence identity to the amino acid sequence of SEQ ID NOs: 1, 2, 3, or 4. SEQ ID NOs: 1 and 2 are amino acid sequences of norV and norW derived from *E. coli*, respectively. SEQ ID NOs: 3 and 4 are amino acid sequences of norB and norC derived from *Paracoccus versutus*, respectively.

A gene encoding the nitric oxide reductase may have 75% or greater, 80% or greater, 85% or greater, 90% or greater, or 95% or greater sequence identity to the nucleotide sequence of SEQ ID NOs: 5, 6, 7, or 8. SEQ ID NOs: 5 and 6 are nucleotide sequences encoding the amino acid sequences of norV and norW derived from *E. coli*, respectively. SEQ ID NOs: 7 and 8 are nucleotide sequences encoding the amino acid sequences of norB and norC derived from *Paracoccus versutus*, respectively.

With regard to the above recombinant microorganism, the genetic modification may increase expression of the gene encoding the nitric oxide reductase. The genetic modification may increase the copy number of the nitric oxide reductase gene. The genetic modification may increase the copy number of a gene encoding a polypeptide having 80% or greater, 85% or greater, 90% or greater, or 95% or greater sequence identity to the amino acid sequence of SEQ ID NO: 1, 2, 3, or 4. The gene may have 80% or greater, 85% or greater, 90% or greater, or 95% or greater sequence identity to the nucleotide sequence of SEQ ID NO: 5, 6, 7, or 8. The genetic modification may introduce the gene encoding the nitric oxide reductase into a microorganism, for example, via a vehicle such as a vector. The gene encoding the nitric oxide reductase may or may not be integrated within the chromosome (genome) of the microorganism. The introduced gene encoding the nitric oxide reductase may include a plurality of copies of the gene, for example, 2 or more, 5 or more, 10 or more, 20 or more, 50 or more, 100 or more, or 1000 or more copies of the gene.

The recombinant microorganism may belong to the genus *Escherichia* or the genus *Paracoccus*. The recombinant microorganism may be *E. coli* or *Paracoccus versutus*.

The recombinant microorganism may reduce a concentration of nitric oxide present in a sample. The reduction may include converting nitric oxide to nitrous oxide (N$_2$O) by the nitric oxide reductase, converting the converted nitrous oxide to nitrogen (N$_2$) by nitrous oxide reductase, or a combination thereof. The sample may be in a liquid or gas state. The sample may be industrial wastewater or waste gas. The sample may be any sample, as long as it includes a nitrogen oxide such as nitric oxide. The nitrogen oxide may include N$_2$O, NO, N$_2$O$_3$, NO$_2$, N$_2$O$_4$, N$_2$O$_5$, or a combination thereof.

Another aspect provides a composition for use in reducing a concentration of nitric oxide in a sample, the composition including the recombinant microorganism including a genetic modification that increases activity of nitric oxide reductase (NOR) in the recombinant microorganism.

With regard to the composition, the recombinant microorganism, the sample, and the nitric oxide are the same as described above.

With regard to the composition, the term "reducing" may refer to reduction of a concentration of nitric oxide in a sample, and may include complete removal of the nitric oxide from the sample. The sample may be a gas or a liquid. The sample may not naturally include the recombinant microorganism. The composition may further include a substance that increases solubility of nitric oxide in a medium or a culture.

With regard to the composition, the nitric oxide may be in the form of Fe(II)(L)—NO. Fe(II)(L)—NO represents a complex formed by chelating a chelating agent L with Fe$^{2+}$ and NO. The L may be, for example, ethylenediamine, diethylenetriamine, triethylenetetramine, hexamethylenetetramine, N-(2-hydroxyethyl)ethylenediamine-triacetic acid (HEDTA), ethylenediamine-tetraacetic acid (EDTA), iminodiacetic acid, nitrilo-triacetic acid (NTA), or diethylenetriaminepentaacetic acid (DTPA). Therefore, Fe(II)(L)—NO may be in a form in which a nitrogen oxide such as N$_2$O, NO, N$_2$O$_3$, NO$_2$, N$_2$O$_4$ and N$_2$O$_5$ are modified to be soluble in an aqueous solution. Fe(II)(L)—NO may be formed by bringing a Fe(II)(L)-containing aqueous solution into contact with a sample including nitrogen oxide. The contacting may include mixing an aqueous medium with a liquid sample including nitrogen oxide or bringing the aqueous medium into contact with a gaseous sample including nitrogen oxide. However, the recombinant microorganism is not limited to this specific mechanism in reducing a concentration of nitric oxide in a sample.

The composition may be used for reducing a concentration of nitric oxide in a sample by contacting the composition with the sample. The contacting may be performed in a liquid phase. The contacting may be performed by, for example, bringing a culture including the microorganism cultured in a culture medium into contact with the sample. The contacting may be performed under conditions in which the microorganism grows. The contacting may be performed in a sealed container. The contacting may include culturing or incubating the recombinant microorganism in the presence of the nitric oxide-containing sample. The contacting includes culturing the recombinant microorganism in a sealed container and under conditions in which the recombinant microorganism grows.

Still another aspect provides a method of reducing a concentration of nitric oxide in a sample, the method including contacting the recombinant microorganism including a genetic modification that increases activity of NOR into contact with the nitric oxide-containing sample.

With regard to the method, the recombinant microorganism and the nitric oxide-containing sample are the same as described above.

With regard to the method, the nitric oxide may be in the form of Fe(II)(L)—NO. Fe(II)(L)—NO represents a complex formed by chelating a chelating agent L with $Fe^{2+}$ and NO. In the complex, the L may be, for example, ethylenediamine, diethylenetriamine, triethylenetetramine, hexamethylenetetramine, N-(2-hydroxyethyl)ethylenediamine-triacetic acid (HEDTA), ethylenediamine-tetraacetic acid (EDTA), iminodiacetic acid, nitrilo-triacetic acid (NTA), or diethylenetriaminepentaacetic acid (DTPA). Therefore, Fe(II)(L)—NO may be a form in which a nitrogen oxide such as $N_2O$, NO, $N_2O_3$, $NO_2$, $N_2O_4$ and $N_2O_5$ are modified to be soluble in an aqueous solution. Fe(II)(L)—NO may be formed by bringing a Fe(II)(L)-containing aqueous solution into contact with nitrogen oxide. The contacting may include mixing an aqueous medium with a liquid sample including nitrogen oxide or bringing the aqueous medium into contact with a gaseous sample including nitrogen oxide. However, the recombinant microorganism is not limited to this specific mechanism in reducing a concentration of nitric oxide in a sample.

With regard to the method, the contacting may be performed in a liquid phase. The contacting may be performed by, for example, bringing a culture including the recombinant microorganism cultured in a medium into contact with the sample. The contacting may be performed under conditions where the microorganism grows. The contacting may be performed in a sealed container. The contacting may be performed when the growth phase of the recombinant microorganism is an exponential phase or a stationary phase. The culturing may be performed under aerobic or anaerobic conditions. The contacting may be performed in a sealed container under conditions in which the recombinant microorganism may survive. The conditions where the recombinant microorganism may survive, may be a condition in which the recombinant microorganism is allowed to survive or is allowed to be in a resting state, e.g., a condition in which death of the recombinant microorganism substantially does not occur.

With regard to the method, the sample may be in a liquid or gas state. The sample may be industrial wastewater or waste gas. The sample may be actively or passively brought into contact with the culture of the recombinant microorganism. The sample may be, for example, sparged into the culture of the recombinant microorganism. In other words, the sample may be blown through the medium or the culture of the recombinant microorganism. The sparging may include blowing of the sample from the bottom to the top of the medium or the culture of the recombinant microorganism. The sparging may include injecting of droplets of the sample. The nitric oxide may be in the form of Fe(II)(L)—NO.

With regard to the method, the contacting may be performed in a batch or continuous manner. The contacting may include, for example, bringing the contacted sample, which is obtained in the reducing, into contact with a fresh recombinant microorganism including a genetic modification that increases activity of nitric oxide reductase (NOR). The contacting with the fresh microorganism may be performed two times or more, for example, two times, three times, five times, or ten times, or more than 10 times. The contacting may be continued or repeated until the concentration of nitric oxide in the sample reaches a desired minimum (reduced) concentration.

Still another aspect provides a method of preparing a recombinant microorganism, the method including introducing into a microorganism, a genetic modification that increases activity of nitric oxide reductase (NOR). A method of preparing a recombinant microorganism may include introducing a gene encoding a nitric oxide reductase into a microorganism. The introducing of the gene encoding the nitric oxide reductase may include introducing a vehicle including the gene into the microorganism. With regard to the method, the genetic modification may include amplification of the gene, manipulation (modification) of a regulatory sequence of the gene, or manipulation of the sequence of the gene itself. The manipulation may include insertion, substitution, conversion, or addition of a nucleotide.

A recombinant microorganism according to an aspect may be used in removing nitric oxide from a sample.

A composition according to another aspect may be used in reducing a concentration of nitric oxide in a sample.

A method of reducing a concentration of nitric oxide in a sample according to still another aspect may efficiently reduce the concentration of nitric oxide in the sample.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
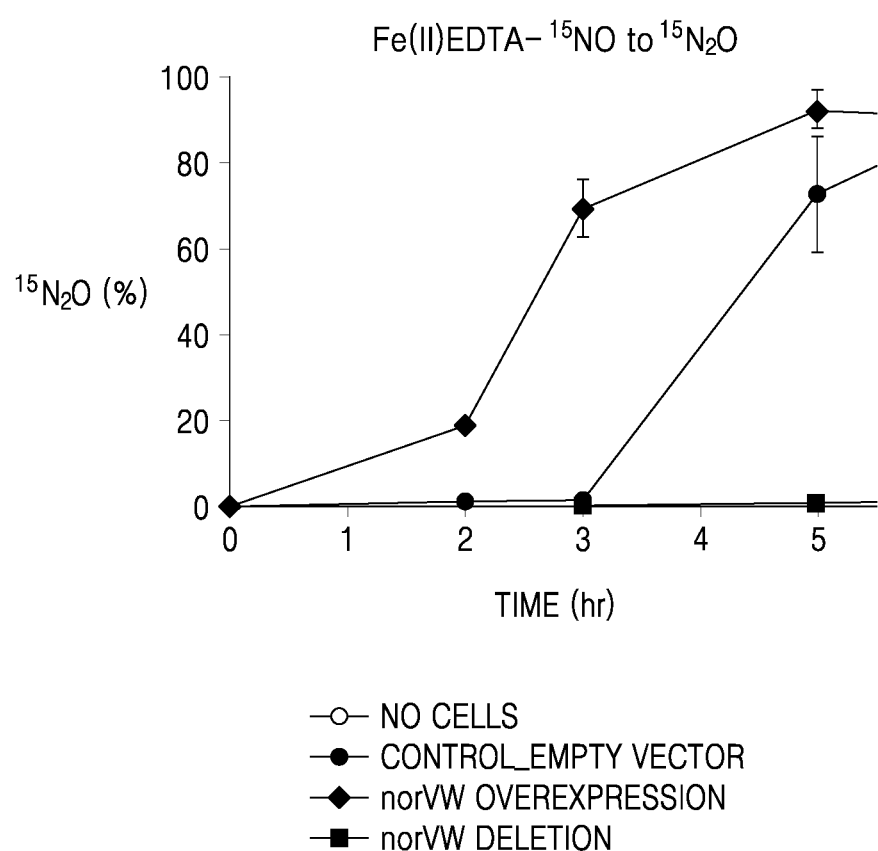
FIG. 1 is a graph which shows the conversion of Fe(II) EDTA-$^{15}$NO to $^{15}N_2O$ over time using recombinant *Escherichia coli* (*E. coli*) in which a nitric oxide reductase (NOR) pathway is enhanced.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

The terminology used herein is for the purpose of describing particular embodiments only and is not intended to be limiting. "At least one" is not to be construed as limiting "a" or "an." As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present disclosure will be described in more detail with reference to exemplary embodiments. However, these exemplary embodiments are only for illustrating the present disclosure, and the scope of the present disclosure is not limited to these exemplary embodiments.

EXAMPLE 1

Examination and Improvement of Ability of *E. coli* to Convert Fe(II)EDTA-NO to $N_2O$ Through Genetic Engineering of *E. coli* Nitric Oxide (NOR)

1.1. Preparation of Mutant and Recombinant *E. Coli* norV and norW genes were deleted from *E. coli* W3110 strain using a one-step inactivation method (K A Datsenko and B L Wanner, Proc. Natl. Acad. Sci. USA., 2000 Jun. 6; 97(12):6640-5).

To delete the norVW gene, PCR was performed using a pKD3 vector as a template and the oligonucleotides of SEQ ID NOs: 9 and 10 as primers. The obtained DNA fragment was electroporated into competent cells of the *E. coli* W3110 strain expressing λ-red recombinase to prepare a norVW gene-deleted mutant strain. To examine the deletion of the norVW gene, colony PCR was performed using primers of SEQ ID NOs: 11 and 12. As a result, the norVW gene-deleted W3110, designated delta norVW (ΔnorVW) strain was obtained.

Next, a recombinant strain was prepared, in which *E. coli*-derived norVW gene was overexpressed in *E. coli* W3110. In detail, *E. coli* W3110 was cultured in a medium, *E. coli* genomic DNA (gDNA) was extracted from the culture, and PCR was performed using the gDNA as a template and oligonucleotides of SEQ ID NOs: 13 and 14 as a primer set, to amplify the *E. coli* norVW gene including the nucleotide sequences of SEQ ID NOs: 5 and 6. PCR amplification was performed using a vector pIND4 (AC Ind et al. Appl Environ Microbiol. 2009 October; 75(20): 6613-5) as a template and oligonucleotides of SEQ ID NOs: 15 and 16 as a primer set to obtain a vector fragment. The norVW gene was ligated to the vector pIND4 using a method according to an InFusion Cloning Kit (Clontech Laboratories, Inc.) to prepare a norVW-overexpressing vector pIND4-norVW. At this time, expression of the norVW gene was induced by isopropyl β-D-1-thiogalactopyranoside (IPTG).

The norVW-overexpressing vector was introduced into *E. coli* W3110 cells by an electroporation method (Sambrook, J & Russell, D. W., New York: Cold Spring Harbor Laboratory Press, 2001) to prepare a strain in which the ability to reduce Fe(II)EDTA-NO was improved. The transformed strain was obtained by selection on an LB plate containing kanamycin (50 μg/ml).

1.2. Examination and Improvement of Ability to Convert Fe(II)EDTA-NO to $N_2O$

The norVW gene-deleted *E. coli* W3110 (ΔnorVW) was cultured in an LB medium at 30° C. with shaking at 230 rotations per minute (rpm). The norVW gene-overexpressing *E. coli* W3110 strain (W3110/pIND4-norVW) was cultured in an LB medium at 30° C. with shaking at 230 rpm to induce norVW gene expression by adding 0.5 mM IPTG. Next, the norVW-deleted *E. coli* and the norVW gene-overexpressing *E. coli* cells were isolated. The isolated cells were added to an M9 medium containing 5 grams per liter (g/L) glucose and 5 millimolar (mM) Fe(II)EDTA-$^{15}$NO at pH 7.0 to obtain and $OD_{600}$ of 1, and as a result, a reaction mixture was obtained.

30 milliliters (mL) of the reaction mixture was added to a 60-mL serum bottle, and cultured at 30° C. with shaking at 140 rpm for 5 hours. The serum bottle was maintained in an anaerobic chamber and under anaerobic conditions. A control group was the same as above, except that a control strain, i.e., *E. coli* including an empty vector, was used.

Next, the gas in the headspace of the reaction serum bottle was sampled and the production amount of $^{15}N_2O$ was analyzed by gas chromatography-mass spectrometry (GC-MS).

The results are shown in FIG. 1. FIG. 1 is a graph of $^{15}N_2O$ amount (%) versus time (hr), which shows the results of converting Fe(II)EDTA-$^{15}$NO to $^{15}$N$_2$O using the recombinant *E. coli* in which the NOR pathway was enhanced.

As shown in FIG. 1, the norVW gene-deleted *E. coli* W3110 (ΔnorVW strain) lost 100% of its ability to convert Fe(II)EDTA-$^{15}$NO to $^{15}$N$_2$O. Further, the norVW-overexpressing *E. coli* strain showed remarkably improved ability to reduce Fe(II)EDTA-$^{15}$NO to $^{15}$N$_2$O, as compared with the control group.

EXAMPLE 2

Improvement of Ability to Reduce Fe(II)EDTA-NO to N$_2$ Using Recombinant *Paracoccus Versutus* Strain Including *E. Coli* Nitric Oxide (NOR) Genes (norV, norW)

2.1. Preparation of Recombinant *Paracoccus Versutus* Strain

Into a natural denitrifying bacterium, *Paracoccus versutus* strain DSM 582 (hereinafter, referred to as 'Pv'.), the recombinant vector including the *E. coli*-derived norVW gene obtained in Example 1 was introduced. The *E. coli*-derived norVW-overexpressing vector was introduced into *Paracoccus versutus* DSM 582 cells by electroporation (Sambrook, J & Russell, D. W., New York: Cold Spring Harbor Laboratory Press, 2001) to prepare a strain in which the ability to reduce Fe(II)EDTA-NO to N$_2$ was improved. The transformed strain (Pv/pIND4-Ec norVW) was obtained by selection on an LB plate containing kanamycin (50 μg/ml). The recombinant vector was pIND4-Ec norVW, which was prepared in the same manner as the method described in Example 1. As a result, a Pv/pIND4-Ec norVW strain was finally obtained.

2.2. Improvement of Ability to Reduce Fe(II)EDTA-NO to N$_2$

The recombinant *Paracoccus versutus* strain (Pv/pIND4-Ec norVW), in which *E. coli*-derived norVW gene was introduced into a *Paracoccus versutus* strain, was cultured in an LB medium at 30° C. with shaking at 230 rpm to induce expression of the norVW gene by adding 0.5 mM IPTG. Next, the norVW-overexpressing *Paracoccus versutus* cells were isolated.

The isolated cells were added to an M9 medium containing 5 g/L glucose and 5 mM Fe(II)EDTA-$^{15}$NO at pH 7.0 to obtain an OD$_{600}$ of 1, and as a result, a reaction mixture was obtained.

30 mL of the reaction mixture was added to a 60-mL serum bottle, and cultured at 30° C. with shaking at 140 rpm for 5 hours. The serum bottle was maintained in an anaerobic chamber and under anaerobic conditions. A control group was the same as above, except that a *Paracoccus versutus* control strain, i.e., *Paracoccus versutus* including an empty vector, was used.

Next, the gas in the headspace of the reaction serum bottle was sampled and the production amount of $^{15}$N$_2$O was analyzed by GC-MS.

Figure 2:
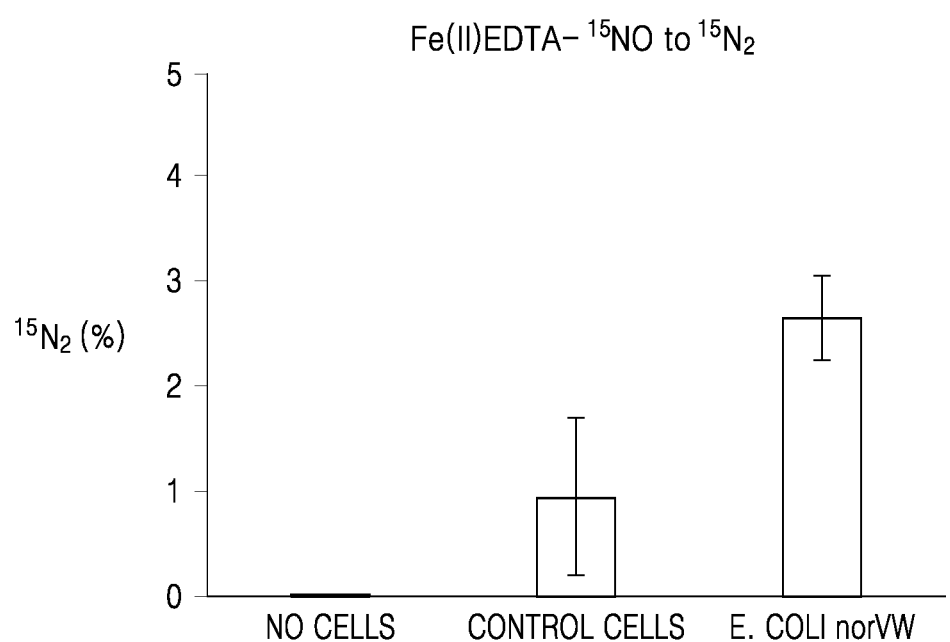
FIG. 2 is a graph which shows the conversion of Fe(II) EDTA-$^{15}$NO to $^{15}N_2$ using recombinant *Paracoccus versutus* (*P. versutus*) in which the NOR pathway is enhanced.

The results are shown in FIG. 2. FIG. 2 is a graph of $^{15}$N$_2$O amount (%) versus test sample, which shows the results of converting Fe(II)EDTA-$^{15}$NO to $^{15}$N$_2$ using the recombinant *Paracoccus versutus* in which the NOR pathway was enhanced.

As shown in FIG. 2, Pv/pIND4-Ec norVW demonstrated a remarkably improved ability to reduce Fe(II)EDTA-$^{15}$NO to $^{15}$N$_2$, as compared with the control group.

EXAMPLE 3

Improvement of Ability to Reduce Fe(II)EDTA-NO to N$_2$ Using Recombinant *Paracoccus Versutus* Strain Overexpressing *Paracoccus Versutus*-Derived Nitric Oxide Genes (norC, norB)

3.1. Preparation of Recombinant *Paracoccus Versutus* Strain

A recombinant Pv strain overexpressing NorCB gene which is derived from a natural denitrifying bacterium, *Paracoccus versutus* DSM 582 (Pv) strain, was prepared. In detail, *Paracoccus versutus* DSM 582 was cultured in an LB medium, and *Paracoccus versutus* DSM 582 gDNA was extracted from the culture, and PCR was performed using this gDNA as a template and the oligonucleotides of SEQ ID NOs: 17 and 18 as a primer set to amplify the *Paracoccus versutus* DSM 582 norCB gene including nucleotide sequences of SEQ ID NOs: 7 and 8. PCR amplification was performed using a vector pIND4 (AC Ind et al., Appl Environ Microbiol., 2009 October; 75(20), pp. 6613-5) as a template and oligonucleotides of SEQ ID NOs: 19 and 20 as a primer set to obtain a vector fragment. The norCB gene (SEQ ID NO:21) was ligated to the vector pIND4 using a method described in an InFusion Cloning Kit (Clontech Laboratories, Inc.) to prepare a norCB-overexpressing vector pIND4-Pv norCB. At this time, expression of the norCB gene was induced by IPTG.

The norCB-overexpressing vector was introduced into *Paracoccus versutus* DSM 582 cells by an electroporation method (Sambrook, J & Russell, D. W., New York: Cold Spring Harbor Laboratory Press, 2001) to prepare a strain, in which ability to reduce Fe(II)EDTA-NO was improved. The transformed strain (Pv/pIND4-Pv NorCB) was obtained by selection of an LB plate containing kanamycin (50 μg/ml).

3.2. Improvement of Ability to Reduce Fe(II)EDTA-NO to N$_2$

The Pv/pIND4-Pv NorCB strain was cultured in an LB medium at 30° C. with shaking at 230 rpm, and NorCB gene expression was induced by adding 0.5 mM IPTG. Next, the NorCB gene-overexpressing Pv/pIND4-Pv NorCB cells were isolated. The isolated cells were added to an M9 medium containing 5 g/L glucose and 5 mM Fe(II)EDTA-$^{15}$NO at pH 7.0 to obtain an OD$_{600}$ of 1, and as a result, a reaction mixture was obtained.

30 mL of the reaction mixture was added to a 60-mL serum bottle, and cultured at 30° C. with shaking at 140 rpm for 5 hours. The serum bottle was maintained in an anaerobic chamber and under anaerobic conditions. A control group was the same as above, except that a control strain, i.e., *E. coli* including an empty vector was used.

Next, the gas in the headspace of the reaction serum bottle was sampled and the production amount of $^{15}$N$_2$ was analyzed by GC-MS.

Figure 3:
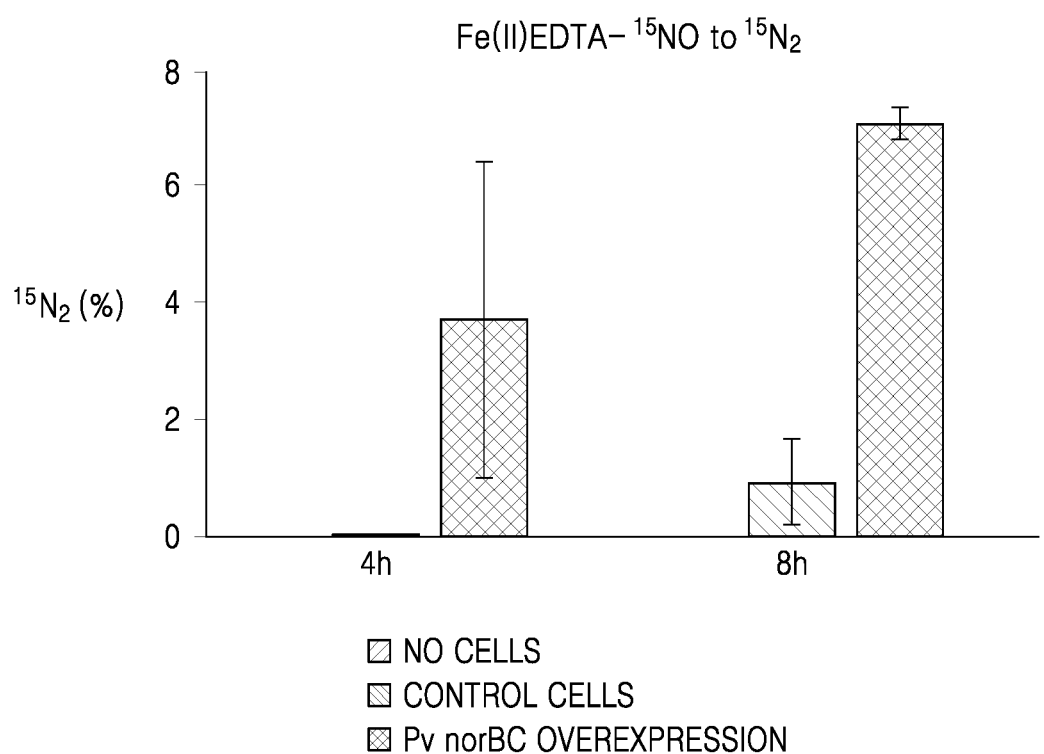
FIG. 3 is a graph which shows the conversion of Fe(II) EDTA-$^{15}$NO to $^{15}N_2$ using recombinant *Paracoccus versutus* in which the NOR pathway is enhanced.

The results are shown in FIG. 3. FIG. 3 is a graph of $^{15}$N$_2$O concentration (%) versus test sample, which shows results of converting Fe(II)EDTA-$^{15}$NO to $^{15}$N$_2$ using the recombinant *Paracoccus versutus* in which the NOR pathway was enhanced. As shown in FIG. 3, NorCB-overexpressing *Paracoccus versutus* strain showed remarkably improved ability to reduce Fe(II)EDTA-$^{15}$NO to $^{15}$N$_2$, as compared with the control group.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A recombinant bacterium comprising a genetic modification that increases expression of a gene encoding a nitric oxide reductase in the recombinant bacterium, wherein the recombinant bacterium belongs to the genus *Escherichia* or the genus *Paracoccus*, wherein the gene originates from *Paracoccus versutus* and wherein the nitric oxide reductase comprises a polypeptide having 95% or greater sequence identity to a polypeptide encoded by SEQ ID NO:21.

2. A composition for reducing a concentration of nitric oxide in a sample, the composition comprising the recombinant bacterium according to claim 1.

3. A method of reducing a concentration of nitric oxide in a sample containing nitric oxide, the method comprising contacting the sample with the recombinant bacterium according to claim 1.

4. The method of claim 3, wherein the genetic modification increases the copy number of the gene encoding the nitric oxide reductase.

5. The method of claim 3, wherein the nitric oxide (NO) is in a form of Fe(II)(L)—NO, which is a complex formed by chelating a chelating agent L with $Fe^{2+}$ and NO.

6. The method of claim 3, wherein the contacting is performed in a sealed container.

7. The method of claim 3, wherein the contacting comprises culturing or incubating the recombinant bacterium in the presence of the nitric oxide-containing sample.

8. The method of claim 3, wherein the contacting comprises culturing the recombinant bacterium in a sealed container and under conditions in which the recombinant bacterium grows.

9. The recombinant bacterium of claim 1, wherein the genetic modification increases the copy number of the gene encoding the nitric oxide reductase.

10. The method of claim 3, wherein the sample is in a liquid state or gas state.

* * * * *